Jan. 5, 1926. 1,568,922
F. W. J. ROBINSON
DEVICE FOR OBVIATING THE GLARE OF THE HEADLIGHTS
OF MOTOR CARS AND OTHER VEHICLES
Filed Jan. 19, 1925

Inventor
F. W. J. Robinson
by his Attorney

Patented Jan. 5, 1926.

1,568,922

UNITED STATES PATENT OFFICE.

FRANCIS WILLIAM JAMES ROBINSON, OF GERMISTON, TRANSVAAL, SOUTH AFRICA.

DEVICE FOR OBVIATING THE GLARE OF THE HEADLIGHTS OF MOTOR CARS AND OTHER VEHICLES.

Application filed January 19, 1925. Serial No. 3,512.

*To all whom it may concern:*

Be it known that I, FRANCIS WILLIAM JAMES ROBINSON, a citizen of the Union of South Africa, residing at 12 Small Street, Germiston, Transvaal, South Africa, have invented a new and useful New or Improved Device for Obviating the Glare of the Headlights of Motor Cars and Other Vehicles, of which the following is a specification.

My invention relates to a new or improved device for obviating the dazzling effect produced by the headlights of motor-cars and other vehicles.

For this purpose I provide a translucent screen composed of a number of slats of frosted mica which is placed in front of the headlight. The interposition of the frosted mica has the effect of taking the dazzling qualities out of the light and diffusing the same without substantially detracting from its illuminative power.

Referring to the drawings, which form part of this specification,

Figure 1:
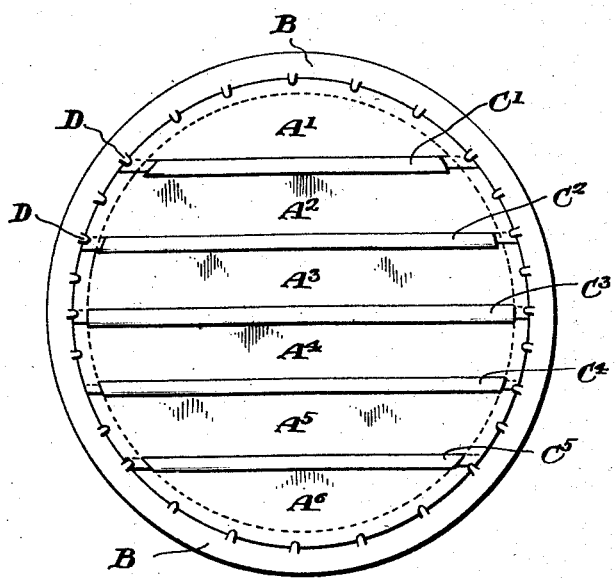
Fig. 1 is a rear elevation of the screen.
Figure 3:
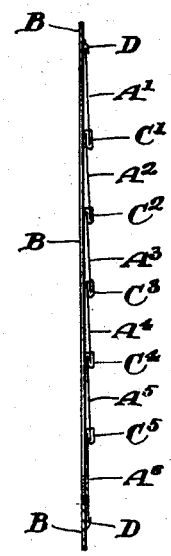
Fig. 3 is a section thereof.
Figure 2:
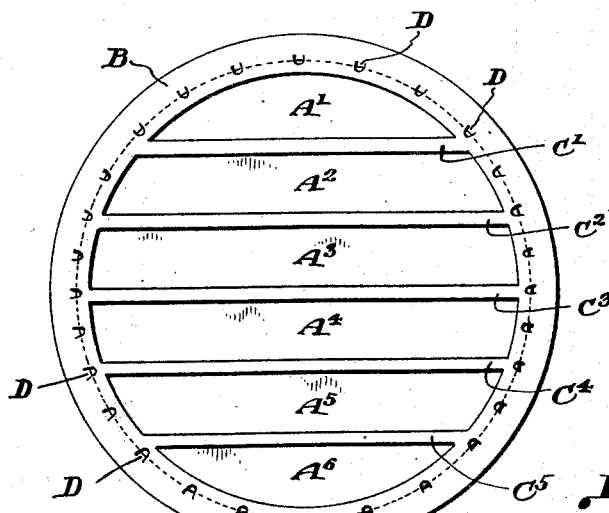
Fig. 2 is a front elevation thereof.

My said device consists of six (or such other number as may be suitable) slats of of frosted mica so shaped and so placed adjacent to each other as to form a circular screen of diameter somewhat less than the diameter of the front of the lamp. In Figs. 1, 2 and 3 the slats of mica are indicated by the letters $A_1$, $A_2$, $A_3$, $A_4$, $A_5$, and $A_6$.

Figure 4:
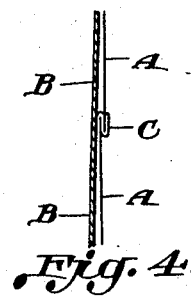
Fig. 4 is an enlarged section of one of the joints hereinafter to be described between the slats of frosted mica.

The said slats of mica $A_{1-6}$ are held together in a circular frame B made of German silver or other suitable material and provided with cross-strips $C_1$, $C_2$, $C_3$, $C_4$ and $C_5$. The circumference of the frame B is equal to that of the front of the headlight. The said cross-strips $C_{1-5}$ which are used to join together the slats of mica $A_{1-6}$ may be stamped out in the same piece as the frame B. The cross-strips as stamped out are three times the breadth of the cross-strips as shown in Figs. 1 and 2, where they are three-fold, being folded in Z-section, as more clearly appears from the section Fig. 3 and the enlarged section Fig. 4. The two interstices of each of the cross-strips folded in Z-section as aforesaid receive the edges of the adjacent slats of mica and a joint is effected by flattening the said strips.

The edges of the said slats of mica are secured to the frame B by means of semi-circular lips D stamped out of the said frame or by other suitable means.

The screen may suitably be fitted to the front of the headlight in the bevel of the lamp, behind the glass thereof.

I claim:

1. A device for obviating the glare of the headlights of vehicles which comprises a skeleton frame having cross strips folded in Z-section, slats of mica having their edges received in the folds of the adjacent cross strips and holding means stamped out of said frame for retaining the slats in position.

2. A device for obviating the glare of headlights of vehicles which comprises a translucent screen composed of a plurality of slats of frosted mica arranged substantially perpendicular to the axis of the head light, and means for retaining said slats in operative position.

3. A device for obviating the glare of headlights of vehicles which comprises a skeleton metal frame adapted to fit within the front of the headlight, a plurality of integral cross strips, a plurality of slats of frosted mica held by said strips substantially perpendicular to the axis of the headlight, and means stamped out of said frame for retaining the slats in position.

FRANCIS WILLIAM JAMES ROBINSON.